(12) United States Patent
Eichenauer

(10) Patent No.: US 7,186,778 B2
(45) Date of Patent: *Mar. 6, 2007

(54) THERMOPLASTIC MOLDING COMPOSITIONS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 118 days.

This patent is subject to a terminal disclaimer.

(21) Appl. No.: 09/997,952

(22) Filed: Nov. 30, 2001

(65) Prior Publication Data

US 2002/0103295 A1   Aug. 1, 2002

(30) Foreign Application Priority Data

Dec. 5, 2000   (DE) ................. 100 60 410

(51) Int. Cl.
  *C08L 51/04*   (2006.01)
(52) U.S. Cl. ............... 525/66; 525/67; 525/69; 525/71
(58) Field of Classification Search ............ 525/71, 525/66, 69, 67
  See application file for complete search history.

(56) References Cited

U.S. PATENT DOCUMENTS

| | | | |
|---|---|---|---|
| 4,009,226 A | 2/1977 | Ott et al. | |
| 4,009,227 A | 2/1977 | Ott et al. | |
| 5,200,441 A | 4/1993 | Kim et al. | |
| 5,236,911 A * | 8/1993 | Koyama et al. | 525/71 |
| 5,352,728 A | 10/1994 | Kim et al. | |
| 5,883,189 A | 3/1999 | Eichenauer et al. | |
| 5,932,655 A | 8/1999 | Auclair et al. | 525/71 |
| 6,489,379 B1 * | 12/2002 | Eichenauer | 523/201 |
| 6,716,916 B1 * | 4/2004 | Sun et al. | 525/66 |
| 6,727,319 B2 * | 4/2004 | Eichenauer | 525/66 |

FOREIGN PATENT DOCUMENTS

| | | | |
|---|---|---|---|
| DE | 41 13 326 | | 10/1992 |
| WO | WO 00/04067 | * | 1/2000 |
| WO | WO 01/16230 | * | 8/2000 |
| WO | 00/56816 | | 9/2000 |

* cited by examiner

Primary Examiner—Jeffrey Mullis
(74) Attorney, Agent, or Firm—Jennifer R. Seng

(57) ABSTRACT

Thermoplastic molding compositions containing grafted polymers produced with different initiator systems are disclosed. The compositions are distinguished by a combination of good toughness and reduced opacity. As a result, appreciably smaller quantities of pigment are needed to color the molding composition.

38 Claims, No Drawings

THERMOPLASTIC MOLDING COMPOSITIONS

FIELD OF THE INVENTION

The invention relates to thermoplastic molding compositions and more particularly to compositions containing grafted rubbers.

SUMMARY OF THE INVENTION

Thermoplastic molding compositions containing grafted polymers produced with different initiator systems are disclosed. The compositions are distinguished by a combination of good toughness and reduced opacity. As a result, appreciably smaller quantities of pigment are needed to color the molding composition.

BACKGROUND OF THE INVENTION

ABS molding compositions have been used for many years in large amounts as thermoplastic resins for producing molded items of all kinds. The range of properties of these resins can be varied to a wide extent.

ABS polymers with special combinations of properties are increasingly required due to the constantly increasing specifications for plastics materials and new areas of application.

A special combination of properties of this type concerns ABS polymers for the production of colored impact-resistant molded items, in particular in the field of application of housings and covering sheets. In this case, the smallest possible amounts of colorants are required to set the desired color and this can be achieved by a lower opacity for the polymer material and optionally by a paler color in the uncolored condition (lower yellowness index).

When using the technology of emulsion polymerization, attempts are usually made to achieve the desired properties by combining different grafted rubber components with a thermoplastic resin matrix.

Thus, for example, DE-A 24 20 357 and DE-A 24 20 358 describe the use of special grafted polymers, obtained by persulfate initiation, with defined values for, inter alia, rubber content, particle size, degree of grafting and styrene:acrylonitrile ratio, in the grafted rubber and in the styrene/acrylonitrile copolymer used, in order to produce improved values for strength, processability and surface gloss. Despite the relatively complicated mode of preparation of these molding compositions, optimum strength/flowability and strength/gloss relationships are not achieved and only inadequate inherent colors are produced.

Similar problems are demonstrated with the products prepared in accordance with EP-A 470 229, EP-A 473 400 and WO 91/13118, wherein impact-resistant, high-gloss, thermoplastic resins are obtained by combining a grafted polymer obtained by redox initiation having a low rubber content and a small particle diameter with a grafted polymer obtained by redox initiation having a high rubber content and a larger particle diameter. The flow characteristics and opacity of these molding compositions, however, do not comply with the constantly increasing specifications for these types of materials.

DE-A 41 13 326 describes thermoplastic molding compositions with two different grafted products, wherein the maximum rubber content of each grafted rubber is 30%. More precise data on the properties are not given in the document; the variability of the products and product properties must be very restricted, however, due to the low rubber content of the grafted polymers.

DE-A 196 49 255 discloses the preparation of ABS molding compositions with very high gloss indices while retaining good values for strength and processability, wherein a combination of a coarse-particled grafted polymer prepared by persulfate initiation and a fine-particled grafted rubber prepared by persulfate initiation is used with the maintenance of specific values for particle size distribution and gel content in the rubbers used.

The disadvantages of these products are, apart from the maintenance of numerous parameters required during preparation, are the not always adequate strength values and also the inadequate inherent color without adding colorants and too high opacity.

Thus, there is the object of providing compositions and thermoplastic molding compositions of the ABS type in which the disadvantages mentioned above do not occur, which have a combination of high strength and reduced opacity and in which the other properties are not adversely affected.

Even small reductions in opacity, which can be determined very accurately, lead to a marked reduction in the amounts of pigment required to color molding compositions.

DETAILED DESCRIPTION OF THE INVENTION

The invention provides compositions containing

A) at least one grafted rubber prepared by free radical emulsion polymerization of at least one vinyl monomer, preferably a copolymer of styrene and acrylonitrile in the ratio by weight of 90:10 to 50:50, wherein styrene and/or acrylonitrile may be entirely or partly replaced by α-methylstyrene, methyl methacrylate or N-phenylmaleic imide, particularly preferably styrene and acrylonitrile in the presence of at least one rubber a) present in latex form with a glass transition temperature below 0° C., preferably a butadiene rubber, particularly preferably polybutadiene, using at least one peroxodisulfate compound as initiator, B) at least one grafted rubber prepared by radical emulsion polymerization of at least one vinyl monomer, preferably a copolymer of styrene and acrylonitrile in the ratio by weight of 90:10 to 50:50, wherein styrene and/or acrylonitrile may be entirely or partly replaced by α-methylstyrene, methyl methacrylate or N-phenylmaleic imide, particularly preferably styrene and acrylonitrile in the presence of at least one rubber b) present in latex form with a glass transition temperature below 0° C., preferably a butadiene rubber, particularly preferably polybutadiene, using at least one redox system as initiator and optionally C) at least one thermoplastic rubber-free polymer obtained by polymerization of at least one resin-forming vinyl monomer, preferably a copolymer of styrene and acrylonitrile in the ratio by weight of 90:10 to 50:50, wherein styrene and/or acrylonitrile may be entirely or partly replaced by α-methylstyrene, methyl methacrylate or N-phenylmaleic imide.

In general, the compositions according to the invention contain the grafted polymers A) and B) in any proportions at all, normally in the range 5 to 95 parts by wt. of A and 95 to 5 parts by wt. of B; 20 to 90 parts by wt. of A) and 10 to 80 parts by wt. of B) are preferred, 30 to 80 parts by wt. of A) and 20 to 70 parts by wt. of B) are particularly preferred, 40 to 75 parts by wt. of A) and 25 to 60 parts by wt. of B) are very particularly preferred (each with respect to 100 parts by wt. of A+B).

The optionally used thermoplastic rubber-free vinyl polymer C) may be used in amounts of 50 to 2000 parts by wt., preferably 100 to 1500 parts by wt. and particularly preferably 150 to 1000 parts by wt. (each with respect to 100 parts by wt. of A+B).

Grafted rubber polymers A) and B) preferably have rubber contents of more than 50 wt. %, particularly preferably more than 55 wt. % and very particularly preferably more than 58 wt. %.

In addition, compositions according to the invention may contain further rubber-free thermoplastic resins that are not built up from vinyl monomers, wherein these thermoplastic resins may be used in amounts of up to 1000 parts by wt., preferably up to 700 parts by wt. and particularly preferably up to 500 parts by wt. (each with respect to 100 parts by wt. of A+B+C).

Rubber a) present in the latex form used to prepare grafted rubber A) and also rubber b) present in the latex form used to prepare grafted rubber B) may be present in the form of latices with monomodal, bimodal, trimodal or multimodal particle size distribution.

Those combinations of grafted rubbers A) and B) during the preparation of which at least one of the rubber latices a) and b) used has a bimodal or trimodal particle size distribution are preferred.

Particularly preferred are those combinations of grafted rubbers A) and B) during the preparation of which the rubber latex a) used has a monomodal particle size distribution and the rubber latex b) used has a bimodal particle size distribution or during the preparation of which the rubber latex a) used has a monomodal particle size distribution and the rubber latex b) used has a trimodal particle size distribution or during the preparation of which the rubber latex a) used has a bimodal particle size distribution and the rubber latex b) used has a bimodal particle size distribution or during the preparation of which the rubber latex a) used has a bimodal particle size distribution and the rubber latex b) used has a trimodal particle size distribution or during the preparation of which the rubber latex a) used has a bimodal particle size distribution and the rubber latex b) used has a monomodal particle size distribution.

Very particularly preferred are those combinations of grafted rubbers A) and B) during the preparation of which the rubber latex a) used has a monomodal particle size distribution and the rubber latex b) used has a bimodal particle size distribution or during the preparation of which the rubber latex a) used has a bimodal particle size distribution and the rubber latex b) used has a bimodal particle size distribution. The (weight) average particle diameter ($d_{50}$ value) of the monomodal, bimodal, trimodal or multimodal rubber latices a) and b) used to prepare grafted rubbers A) and B) may be varied over wide ranges. Suitable particle diameters are e.g. between 50 and 600 nm, preferably between 80 and 550 nm and particularly preferably between 100 and 500 nm.

The average particle diameters ($d_{50}$) of the rubber latices a) used are preferably smaller than the average particle diameters of the rubber latices b) used; the average particle diameters of the rubber latices a) and b) used particularly preferably differ by at least 40 nm, very particularly preferably by at least 80 nm.

Rubbers a) and b) present in the latex form and suitable for preparing grafted rubbers in accordance with component A) and component B) are in principle all rubber polymers with a glass transition temperature below 0° C. Examples of these types of rubber polymers are polydienes such as, for example, polybutadiene and polyisoprene, alkyl acrylate rubbers based on $C_1$–$C_8$ alkyl acrylates such as, for example, poly-n-butyl acrylate, polysiloxane rubbers such as, for example, products based on polydimethylsiloxane.

Preferred rubbers a) and b) for preparing grafted rubbers A) and B) are butadiene polymer latices which can be prepared by emulsion polymerization of butadiene. This polymerization process is well-known and is described, for example, in Houben-Weyl, Methoden der Organischen Chemie, Makromolekulare Stoffe, part I, p. 674 (1961), Thieme Verlag Stuttgart. Up to 50 wt. %, preferably up to 30 wt. % (with respect to the total amount of monomers used to prepare the butadiene polymer), of one or more monomers which can copolymerise with butadiene may be used as comonomers.

The following may be mentioned by way of example, and are preferably used as such monomers: isoprene, chloroprene, acrylonitrile, styrene, α-methylstyrene, $C_1$–$C_4$ alkylstyrenes, $C_1$–$C_8$ alkyl acrylates, $C_1$–$C_8$ alkyl methacrylates, alkylene glycol diacrylates, alkylene glycol dimethacrylates, divinylbenzene; butadiene alone is preferably used. When preparing a) and b), it is also possible, using known methods, to first prepare a finely divided butadiene polymer and then to agglomerate in a known manner in order to achieve the required particle size. Relevant techniques have been described (see EP-A 0 029 613; EP-A 0 007 810; DD-A 144 415; DE-A 12 33 131; DE-A 12 58 076; DE-A 21 01 650; U.S. Pat. No. 1,379,391).

In principle, rubber latices a) and b) may also be prepared by emulsifying finely divided rubber polymers in aqueous media (see Japanese patent application 55 125 102).

To prepare rubber latices a) and b) with bimodal, trimodal or multimodal particle size distributions, monomodal rubber latices with different average particle sizes and narrow particle size distributions are preferably blended with each other.

Monomodal rubber latices with a narrow particle size distribution in the context of the invention are understood to be those latices which have a width of particle size distribution (measured as $d_{90}$–$d_{10}$ from the integral particle size distribution) of 30 to 150 nm, preferably 35 to 100 nm and particularly preferably 40 to 80 nm.

The differences in average particle diameters ($d_{50}$ from the integral particle size distribution) of the rubber latices used in the mixture for the preferred production of bimodal, trimodal or multimodal particle size distributions are preferably at least 30 nm, particularly preferably at least 60 nm and very particularly preferably at least 80 nm.

Monomodal rubber latices with a narrow particle size distribution are preferably prepared by the emulsion polymerization of monomer mixtures containing suitable monomers, preferably butadiene, particularly preferably butadiene, by the so-called seed polymerization technique, in which a finely divided polymer, preferably a rubber polymer, particularly preferably a butadiene polymer, is first prepared as a seed latex and then further polymerized by further reaction with rubber-forming monomers, preferably with monomers containing butadiene, to give larger particles (see e.g. Houben-Weyl, Methoden der Organischen Chemie, Makromolekulare Stoffe, part I, p. 339 (1961), Thieme Verlag Stuttgart).

The procedure preferably makes use of the seed-batch process or the seed-feed process.

The gel contents of the rubber latices a) and b) used to prepare grafted rubbers A) and B) are generally not critical and may be varied over wide ranges. Values between about 30% and 98%, preferably between 40% and 95%, are normally used.

The gel contents of the rubber latices a) used are preferably higher than the gel contents of the rubber latices b) used, particularly preferably the gel contents of the rubber latices a) and b) used differ by at least 5%, very particularly preferably by at least 10%.

The average particle diameter $d_{50}$, and also the $d_{10}$ and $d_{90}$ values, may be determined by ultracentrifuge measurements (see W. Scholtan, H. Lange; Kolloid Z. u. Z. Polymere 250, p. 782 to 796 (1972)), the cited values for gel content being given with respect to determination by the wire cage method in toluene (see Houben-Weyl, Methoden der Organischen Chemie, Makromolekulare Stoffe, part I, p. 307 (1961), Thieme Verlag Stuttgart).

In principle, the gel contents of rubber latices a) and b) may be adjusted in a known manner by the use of suitable reaction conditions (e.g. high reaction temperature and/or polymerization up to high conversions and also optionally the addition of cross-linking substances to produce a high gel content or e.g. low reaction temperature and/or terminating the polymerization reaction before the occurrence of too great an extent of cross-linking and also optionally the addition of molecular weight regulators such as, for example, n-dodecyl mercaptan or t-dodecyl mercaptan, to produce a low gel content). Conventional anionic emulsifiers such as alkyl sulfates, alkyl sulfonates, aralkyl sulfonates, soaps of saturated or unsaturated fatty acids and also alkaline disproportionated or hydrogenated abietic or tall oil acids are used as emulsifiers, preferably emulsifiers with carboxyl groups (e.g. salts of $C_{10-C_{18}}$ fatty acids, disproportionated abietic acid).

During the preparation of grafted rubbers A) and B), grafted polymerization may be performed in such a way that the monomer mixture is added to rubber latex a) or rubber latex b) in portions or continuously and polymerized.

Specific monomer: rubber ratios are preferably maintained.

To produce grafted rubber A) according to the invention, inorganic persalts, chosen from ammonium peroxodisulfate, potassium peroxodisulfate, sodium peroxodisulfate or mixtures thereof have to be used.

The reaction temperature during the preparation of grafted rubber A) according to the invention may be varied over wide limits. It is generally 25° C. to 160° C., preferably 40° C. to 100° C. and particularly preferably 50° C. to 90° C., wherein the temperature difference between the start and the end of reaction is at least 10° C., preferably at least 15° C. and particularly preferably at least 20° C.

To produce grafted rubber B) according to the invention, at least one redox system is used as initiator.

Suitable redox initiator systems according to the invention consist of an organic oxidizing agent and a reducing agent, wherein heavy metal ions may also be present in the reaction medium: preferably, no heavy metals are present.

Suitable organic oxidizing agents according to the invention are, for example and preferably, di-tert.-butyl peroxide, cumene hydroperoxide, dicyclohexyl percarbonate, tert.-butyl hydroperoxide, p-menthane hydroperoxide or mixtures of these; cumene hydroperoxide and tert.-butyl hydroperoxide are particularly preferred. $H_2O_2$ may also be used.

Reducing agents which may be used according to the invention are preferably water-soluble compounds with a reducing effect, preferably chosen from the group of salts of sulfinic acid, salts of sulfurous acid, sodium dithionite, sodium sulfite, sodium hyposulfite, sodium hydrogen sulfite, ascorbic acid and its salts, Rongalit®C (sodium formaldehyde sulfoxylate), mono- and dihydroxyacetone, sugars (e.g. glucose or dextrose). It is also possible to use e.g. iron(II) salts such as e.g. iron(II) sulfate, tin(II) salts such as e.g. tin(II) chloride, titanium(III) salts such as e.g. titanium(III) sulfate; preferably, however, no metal salts of this type are used.

Particularly preferred reducing agents are dextrose, ascorbic acid (salts) or sodium formaldehyde sulfoxylate (Rongalit®C).

The amount of oxidizing agent used is generally 0.05 to 2.0 wt. %, preferably 0.1 to 1.5 wt. % and particularly preferably 0.2 to 1.2 wt. %. The amount of reducing agent is generally 0.05 to 1.5 wt. %, preferably 0.08 to 1.2 wt. % and particularly preferably 0.1 to 1.0 wt. (related to 100 parts of monomers).

The redox components are generally used in the form of aqueous solutions, aqueous emulsions, aqueous suspensions or other aqueous dispersions.

The reaction temperature during the preparation of grafted rubber B) according to the invention may be varied over wide limits. It is generally 25° C. to 120° C., preferably 35° C. to 100° C. and particularly preferably 40° C. to 85° C., wherein the temperature difference between the start and the end of reaction is at least 10° C., preferably at least 15° C. and particularly preferably at least 20° C.

To produce grafted rubber A) according to the invention, preferably 20 to 60 parts by wt., particularly preferably 25 to 50 parts by wt., of at least one vinyl monomer, preferably a mixture of styrene and acrylonitrile, wherein styrene and/or acrylonitrile may be replaced entirely or partly by α-methylstyrene, methyl methacrylate or N-phenylmaleic imide, are polymerized in the presence of preferably 40 to 80 parts by wt., particularly preferably 50 to 75 parts by wt. (each with respect to the solids) of a rubber latex a).

To produce grafted rubber B) according to the invention, preferably 25 to 70 parts by wt., particularly preferably 30 to 60 parts by wt., of at least one vinyl monomer, preferably a mixture of styrene and acrylonitrile, wherein styrene and/or acrylonitrile may be replaced entirely or partly by α-methylstyrene, methyl methacrylate or N-phenylmaleic imide, are polymerized in the presence of preferably 30 to 75 parts by wt., particularly preferably 40 to 70 parts by wt. (each with respect to the solids) of a rubber latex b).

The monomers used in this graft polymerization are preferably mixtures of styrene and acrylonitrile in the ratio by wt. of 90:10 to 50:50, particularly preferably in the ratio by wt. of 80:20 to 65:35.

In addition, molecular weight regulators may be used during graft polymerization, preferably in amounts of 0.05 to 2 wt. %, particularly preferably in amounts of 0.1 to 1 wt. % (each with respect to the total amount of monomers in the graft polymerization step).

Suitable molecular weight regulators are, for example, alkyl mercaptans such as n-dodecyl mercaptan, t-dodecyl mercaptan; dimers of α-methylstyrene; terpinols.

As rubber-free copolymer C), copolymers of styrene and acrylonitrile in the ratio by wt. of 95:5 to 50:50 are preferably used, wherein styrene and/or acrylonitrile may be replaced entirely or partly by α-methylstyrene, methyl methacrylate or N-phenylmaleic imide.

Copolymers C) with proportions of built-in acrylonitrile units of <30 wt. % are particularly preferred.

These copolymers preferably have weight average molecular weights $M_W$ of 20 000 to 200 000 and intrinsic viscosities [η] of 20 to 110 ml/g (measured in dimethylformamide at 25° C.).

Details of the preparation of these resins are described, for example, in DE-A 2 420 358 and DE-A 2 724 360. Vinyl resins prepared by bulk or solution polymerization have proven especially advantageous. The copolymers may be added individually or in any mixture.

Apart from thermoplastic materials built up from vinyl monomers, the use of polycondensates, e.g. aromatic polycarbonates, aromatic polyestercarbonates, polyesters, polyamides, as rubber-free copolymers in compositions according to the invention is also possible.

Suitable thermoplastic polycarbonates and polyestercarbonates are known (see DE-A 1 495 626, DE-A 2 232 877, DE-A 2 703 376, DE-A 2 714 544, DE-A 3 000 610, DE-A 3 832 396, DE-A 3 077 934), for example those which can be prepared by reacting diphenols of the formulas (I) and (II)

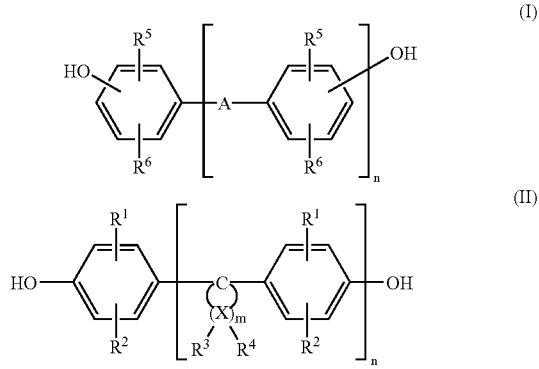

in which

A is a single bond, $C_1$–$C_5$ alkylene, $C_2$–$C_5$ alkylidene, $C_5$–$C_6$ cycloalkylidene, —O—, —S—, —SO—, $SO_2$— or —CO—, $R^5$ and $R^6$, independently, represent hydrogen, methyl or halogen, in particular hydrogen, methyl, chlorine or bromine, $R^1$ and $R^2$, independently, represent hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$-alkyl, in particular benzyl, m is an integer from 4 to 7, preferably 4 or 5, n is 0 or 1, $R^3$ and $R^4$ are chosen individually for each X and represent, independently, hydrogen or $C_1$–$C_6$ alkyl and X represents carbon, with carbonic acid halides, preferably phosgene, and/or with aromatic dicarboxylic acid dihalides, preferably benzene dicarboxylic acid dihalides, by phase interface polycondensation or with phosgene by polycondensation in homogeneous phase (the so-called pyridine process), wherein the molecular weight can be adjusted in a known manner by an appropriate amount of known chain stoppers.

Suitable diphenols of the formulas (I) and (II) are e.g. hydroquinone, resorcinol, 4,4'-dihydroxyphenol, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-chlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxy-phenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (I) are 2,2-bis-(4-hydroxyphenyl)-propane and 1,1-bis-(4-hydroxyphenyl)-cyclohexane, a preferred phenol of the formula (II) is 1,1-bis-(4-hydroxyphenyl)-3,3,5-trimethylcyclohexane.

Mixtures of diphenols may also be used.

Suitable chain stoppers are e.g. phenol, p-tert.-butylphenol, long-chain alkylphenols such as 4-(1,3-tetramethyl-butyl)-phenol in accordance with DE-A 2 842 005, monoalkylphenols, dialkylphenols with a total of 8 to 20 carbon atoms in the alkyl substituents in accordance with DE-A 3 506 472 such a p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The amount of chain stoppers required is generally 0.5 to 10 mol. %, with respect to the sum of the diphenols (I) and (II).

Suitable polycarbonates or polyestercarbonates may be linear or branched; branched products are preferably obtained by incorporating 0.05 to 2.0 mol. %, with respect to the sum of the diphenols used, of trifunctional or more than trifunctional compounds, e.g. those with three or more than three phenolic OH groups.

Suitable polycarbonates or polyestercarbonates may contain aromatically bonded halogen, preferably bromine and/or chlorine; they are preferably halogen-free.

They have molecular weights ($M_w$, weight average), determined e.g. by ultracentrifuging or scattered light measurement, of 10 000 to 200 000, preferably 20 000 to 80 000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates can be prepared from terephthalic acid (or its reactive derivatives) and aliphatic or cycloaliphatic diols with 2 to 10 carbon atoms by known methods (Kunststoff-Handbuch, vol. VIII, p. 695 et seq., Carl Hanser Verlag, Munich 1973).

In preferred polyalkylene terephthalates, 80 to 100, preferably 90 to 100, mol. % of the dicarboxylic acid groups are terephthalic acid groups and 80 to 100, preferably 90 to 100, mol. % of the diol groups are ethylene glycol and/or butanediol-1,4 groups.

Preferred polyalkylene terephthalates may contain, in addition to ethylene glycol or butanediol-1,4 groups, 0 to 20 mol. % of groups from other aliphatic diols with 3 to 12 carbon atoms or cycloaliphatic diols with 6 to 12 carbon atoms, e.g. groups from propanediol-1,3,2-ethylpropanediol-1,3, neopentyl glycol, pentanediol-1,5, hexanediol-1,6, cyclohexane-dimethanol-1,4,3-methylpentanediol-1,3 and -1,6,2-ethylhexanediol-1,3, 2,2-diethylpropanediol-1,3, hexanediol-2,5,1,4-di-(β-hydroxyethoxy-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis(4-hydroxypropoxyphenyl)-propane (DE-A 2 407 647, 2 407 776, 2 715 932).

The polyalkylene terephthalates may be branched by incorporating relatively small amounts of trihydric or tetrahydric alcohols or tribasic or tetrabasic carboxylic acids, as is described in DE-A 1 900 270 and U.S. Pat. No. 3,692,744. Examples of preferred branching agents are trimesic acid, trimellitic acid, trimethylolethane and -propane and pentaerythritol. It is advisable to use not more than 1 mol. % of the branching agent, with respect to the acid component.

Polyalkylene terephthalates which have been prepared solely from terephthalic acid and its reactive derivatives (e.g. its dialkyl esters) and ethylene glycol and/or butanediol-1,4 and mixtures of these polyalkylene terephthalates are particularly preferred.

Preferred polyalkylene terephthalates are also copolyesters which are prepared from at least two of the alcohol components mentioned above: particularly preferred copolyesters are poly(ethyleneglycolbutanediol-1,4) terephthalates.

Preferred suitable polyalkylene terephthalates generally have an intrinsic viscosity of 0.4 to 1.5 dl/g, preferably 0.5 to 1.3 dl/g, in particular 0.6 to 1.2 dl/g, each measured in phenol/o-dichlorobenzene (1:1 parts by wt.) at 25° C.

Suitable polyamides are known homopolyamides, copolyamides and mixtures of these polyamides. They may be partially crystalline and/or amorphous polyamides.

Suitable partially crystalline polyamides are polyamide-6, polyamide-6,6 and mixtures and corresponding copolymers of these components. Furthermore, suitable partially crystalline polyamides are those in which the acid component consists entirely or partly of terephthalic acid and/or isophthalic acid and/or suberic acid and/or sebacic acid and/or azelaic acid and/or adipic acid and/or cyclohexanedicarboxylic acid and in which the diamine component consists entirely or partly of m- and/or p-xylylene diamine and/or hexamethylene diamine and/or 2,2,4-trimethylhexamethylene diamine and/or 2,2,4-trimethylhexamethylene diamine and/or isophorone diamine and the composition of which is known in principle.

In addition polyamides are mentioned which are prepared entirely or partly from lactams with 7–12 carbon atoms in the ring, optionally also with the use of one or more of the starting components mentioned above.

Particularly preferred partially crystalline polyamides are polyamide-6 and polyamide-6,6 and their mixtures. Known products may be used as amorphous polyamides. They are obtained by polycondensation of diamines such as ethylene diamine, hexamethylene diamine, decamethylene diamine, 2,2,4- and/or 2,4,4-trimethylhexamethylene diamine, m- and p-xylylene diamine, bis-(4-aminocyclohexyl)-methane, bis-(4-amino-cyclohexyl)-propane, 3,3'-dimethyl-4,4'-diaminodicylcohexylmethane, 3-aminomethyl-3,5,5-trimethylcyclohexylamine 2,5- and/or 2,6-bis-(aminoethyl)-norbornane and/or 1,4-diaminomethylcyclohexane with dicarboxylic acids such as oxalic acid, adipic acid, azelaic acid, decanedicarboxylic acid, heptadecane-dicarboxylic acid, 2,2,4- and/or 2,4,4-trimethyladipic acid, isophthalic acid and terephthalic acid.

Copolymers which are obtained by polycondensation of several monomers are also suitable, and also copolymers which are prepared by adding aminocarboxylic acids such as ε-aminocaproic acid, ω-aminoundecanoic acid or ω-aminolauric acid or their lactams.

Particularly suitable polyamides are the polyamides prepared from isophthalic acid, hexamethylene diamine and other diamines such as 4,4'-diaminodicyclohexylmethane, isophorone diamine, 2,2,4- and/or 2,4,4-trimethylhexamethylene diamine, 2,5- and/or 2,6-bis-(aminoethyl)-norbornene; or from isophthalic acid, 4,4'-diaminodicyclohexylmethane and ε-caprolactam; or from isophthalic acid, 3,3'-dimethyl-4,4'-diamino-dicyclohexylmethane and lauric lactam; or from terephthalic acid and the isomeric mixture of 2,2,4- and/or 2,4,4-trimethylhexamethylene diamine.

Instead of pure 4,4'-diaminodicylcohexylmethane, mixtures of the positional isomers of diaminodicylcohexylmethane may also be used, these being composed of

| 70 to 99 mol. % | 4,4'-diamino isomer |
| 1 to 30 mol. % | 2,4'-diamino isomer |
| 0 to 2 mol. % | 2,2'-diamino isomer and | optionally the corresponding more highly condensed diamines which are obtained by hydrogenation of technical-grade diaminodiphenylmethane. Up to 30% of the isophthalic acid may be replaced by terephthalic acid.

The polyamides preferably have a relative viscosity (measured in a 1 wt. % strength solution in m-cresol at 25° C.) of 2.0 to 5.0, particularly preferably 2.5 to 4.0.

Preferred compositions according to the invention contain 1 to 60 parts by wt., preferably 5 to 50 parts by wt. of grafted rubber components A)+B) and 40 to 99 parts by wt., preferably 50 to 95 parts by wt. of the rubber-free thermoplastic polymer C).

If in addition further thermoplastic resins which are not built up from vinyl monomers are incorporated, the amount of these is up to 1000 parts by wt., preferably up to 700 parts by wt. and particularly preferably up to 500 parts by wt. (each with respect to 100 parts by wt. of A+B+C).

Compositions according to the invention are prepared by blending components A), B) and C) and optionally other constituents in conventional mixing units (preferably in multiple roll mills, mixer-extruders or internal compounders).

The invention therefore also provides a process for preparing compositions according to the invention, wherein components A), B) and C) and optionally other constituents are blended and then compounded and extruded at elevated temperature, generally at temperatures of 150 to 300° C.

Additives which are required or are expedient based on their art-recognized function may be added to compositions according to the invention during preparation, processing, further processing and final shaping, e.g. antioxidants, UV stabilizers, peroxide destroyers, antistatic agents, lubricants, mould release agents, flame retardants, fillers or reinforcing materials (glass fibers, carbon fibers, etc.) and colorants.

Final shaping may be performed in commercially available processing units and includes e.g. injection molding processing, sheet extrusion with optional subsequent thermoforming, cold forming, extrusion of pipes and profiles or calender processing.

EXAMPLES

In the following examples all the parts quoted are parts by weight and all the %-ages quoted are wt. %, unless stated otherwise.

Components used

A) Grafted Rubbers Prepared Using Peroxodisulfate Compounds as Initiators

A1) 60 parts by wt. (calculated as solids) of an anionic emulsified monomodal polybutadiene latex prepared by radical polymerization, with an average diameter $d_{50}$ of 112 nm and a gel content of 91 wt. %, are adjusted to a solids content of about 20 wt. % with water. Then the mixture is heated to 59° C. and 0.45 parts by wt. of $K_2S_2O_8$ (dissolved in water) are added. Then 40 parts by wt. of a monomer mixture (ratio by wt. styrene:acrylonitrile=73:27), 0.12 parts by wt. of tert.-dodecyl mercaptan and 1.0 part by wt. (calculated as solid substance) of the sodium salt of a resin acid mixture (Dresinate®731, Abieta Chemie GmbH, Gersthofen), dissolved in water with an alkaline pH, are added in parallel over the course of 6 h.

The reaction temperature is raised to 80° C. over the course of 6 h, followed by a post-reaction time of 2 hours at this temperature. After adding about 1 part by wt. of a phenolic antioxidant, coagulation is performed using a magnesium sulfate/acetic acid mixture and, after washing with water, the resulting powder is dried at 70° C.

A2) The procedure described under A1) is repeated, wherein a bimodal polybutadiene latex with an average diameter $d_{50}$ of 158 nm (particle size peaks at 112 nm and 285 nm) and a gel content of 86 wt. % is used.

A3) The procedure described under A1) is repeated, wherein a bimodal polybutadiene latex with an average diameter $d_{50}$ of 202 nm (particle size peaks at 112 nm and 285 nm) and a gel content of 82 wt. % is used.

A4) The procedure described under A1) is repeated, wherein monomodal polybutadiene latex with an average diameter $d_{50}$ of 191 nm and a gel content of 69 wt. % is used.

A5) The procedure described under A1) is repeated, wherein a bimodal polybutadiene latex with an average diameter $d_{50}$ of 216 nm (particle size peaks at 191 nm and 285 nm) and a gel content of 70 wt. % is used.

A6) The procedure described under A1) is repeated, wherein a bimodal polybutadiene latex with an average diameter $d_{50}$ of 240 nm (particle size peaks at 191 nm and 285 nm) and a gel content of 71 wt. % is used.

A7) The procedure described under A1) is repeated, wherein a bimodal polybutadiene latex with an average diameter $d_{50}$ of 245 nm (particle size peaks at 199 nm and 285 nm) and a gel content of 81 wt. % is used.

A8) The procedure described under A1) is repeated, wherein monomodal polybutadiene latex with an average diameter $d_{50}$ of 285 nm and a gel content of 72 wt. % is used.

A9) The procedure described under A1) is repeated, wherein a bimodal polybutadiene latex with an average diameter $d_{50}$ of 350 nm (particle size peaks at 285 nm and 415 nm) and a gel content of 70 wt. % is used.

A10) The procedure described under A1) is repeated, wherein monomodal polybutadiene latex with an average diameter $d_{50}$ of 415 nm and a gel content of 70 wt. % is used.

A11) The procedure described under A6) is repeated, wherein 65 parts by wt. (calculated as solids) of the bimodal polybutadiene latex, 35 parts by wt. of a monomer mixture (ratio by wt. styrene:acrylonitrile=73:27) and 0.10 parts by wt. of tert.-dodecyl mercaptan are used.

A12) The procedure described under A6) is repeated, wherein 70 parts by wt. (calculated as solids) of the bimodal polybutadiene latex, 30 parts by wt. of a monomer mixture (ratio by wt. styrene:acrylonitrile=73:27) and 0.08 parts by wt. of tert.-dodecyl mercaptan are used.

B) Grafted Rubbers Prepared Using Redox Initiator Systems

B1) 60 parts by wt. (calculated as solids) of an anionic emulsified monomodal polybutadiene latex prepared by radical polymerization, with an average particle diameter $d_{50}$ of 285 nm and a gel content of 72 wt. % are adjusted to a solids content of about 20 wt. % with water. Then the mixture is heated to 75° C., after which 0.26 parts by wt. of tert.-butyl hydroperoxide and 0.22 parts by wt. of sodium ascorbate are added in parallel over the course of 8 h and also 40 parts by wt. of a monomer mixture (ratio by wt. styrene:acrylonitrile=73:27) are added over the course of 4 h and the temperature is held at 75° C. for the first 4 h and is then raised to 80° C.

In parallel with the monomers, 1.72 parts by wt. (calculated as solids) of the sodium salt of a resin acid mixture (Dresinate®731, Abieta Chemie GmbH, Gersthofen) are added over 4 h.

After a post-reaction time of one hour at 80° C., about 1 part by wt. of a phenolic antioxidant is added, coagulation is performed with a magnesium sulfate/acetic acid mixture and, after washing with water, the resulting powder is dried at 70° C.

B2) The procedure described under B1) is repeated, wherein a bimodal polybutadiene latex with an average particle diameter $d_{50}$ of 350 nm (particle size peaks at 285 nm and 415 nm) and a gel content of 70 wt. % is used.

B3) The procedure described under B1) is repeated, wherein monomodal polybutadiene latex with an average particle diameter $d_{50}$ of 415 nm and a gel content of 70 wt. % is used.

B4) The procedure described under B1) is repeated, wherein a trimodal polybutadiene latex with an average particle diameter $d_{50}$ of 298 nm (particle size peaks at 196 nm, 291 nm and 415 nm) and a gel content of 65 wt. % is used.

B5) The procedure described under B1) is repeated, wherein a trimodal polybutadiene latex with an average particle diameter $d_{50}$ of 298 nm (particle size peaks at 196 nm, 291 nm and 415 nm) and a gel content of 66 wt. % is used.

C) Thermoplastic Resins

C1) A styrene/acrylonitrile (SAN) copolymer resin (ratio by wt. styrene:acrylonitrile=72:28, $\overline{M}_w \approx 85\,000$, determined by gel permeation chromatography) prepared by solution polymerization.

C2) A styrene/acrylonitrile (SAN) copolymer resin (ratio by wt. styrene:acrylonitrile=72:28, $\overline{M}_w \approx 115\,000$, determined by gel permeation chromatography) prepared by solution polymerization.

Testing the Molding Compositions

The polymer components described above, in the proportions given in table 1, 2 parts by wt. of ethylenediamine bis-stearylamide and 0.1 part by wt. of a silicone oil are blended in an internal compounder and, after granulating, processed to form sheets (to assess the surface and the contrast ratio, dimensions 60×40×2 mm).

The following data are determined:

Notched impact resistance at room temperature ($a_k$(RT)) and at −20° C. ($a_k$(−20° C.)) according to ISO 180/1A (units: kJ/m$^2$), Heat resistance (Vicat) according to DIN 53 460 (units: °C.), Surface gloss according to DIN 67 530 with an angle of reflection of 20° (reflectometer value), Yellowness index (YI) in accordance with ASTM standard D 1925 (type of light: C, observer: 2°, measurement aperture: large area value) using the equation YI=(126X−106Z)/Y, where X, Y, Z=color coordinates in accordance with DIN 5033, Contrast ratio (CR) as a measure of the opacity of the material by measuring a sample in front of a black and a white background in accordance with $$CR = \frac{Y(\text{in front of black background})}{Y(\text{in front of white background})} \times 100$$

wherein Y describes the standard color value from the CEI lab color volume with type of light D 65 and a 10° observer (see DIN 5033, Ulbricht sphere). Measurement takes place using a Spektralphotometer Dataflash SF 600 plus CT.

Assessing the processability of the molding compositions was performed by measuring the injection pressure required at 240° C. (units: bar) (see S. Anders et al., Kunststoffe 81 (1991), 4, pages 336 to 340 and the literature references given there).

The results are summarized in table 2.

From these, it can be seen that molding compositions according to the invention have much improved strength values and also lower and in individual cases equally good opacity values, when compared directly with the particular comparison example, and therefore the amount of pigment required to provide the desired color is much reduced. Other important properties such as thermal resistance, thermoplastic processability, surface gloss and yellowness index are not adversely affected.

TABLE 1

Compositions of molding compositions tested

| Example | A1 (pts by wt) | A2 (pts by wt) | A3 (pts by wt) | A4 (pts by wt) | A5 (pts by wt) | A6 (pts by wt) | A7 (pts by wt) | A8 (pts by wt) | A9 (pts by wt) | A10 (pts by wt) |
|---|---|---|---|---|---|---|---|---|---|---|
| 1 | 16.2 | — | — | — | — | — | — | — | — | — |
| 2 (comparison) | 16.2 | — | — | — | — | — | — | 10.8 | — | — |
| 3 | — | 16.2 | — | — | — | — | — | — | — | — |
| 4 (comparison) | — | 16.2 | — | — | — | — | — | 10.8 | — | — |
| 5 | — | — | 16.2 | — | — | — | — | — | — | — |
| 6 (comparison) | — | — | 16.2 | — | — | — | — | 10.8 | — | — |
| 7 | — | — | — | 16.2 | — | — | — | — | — | — |
| 8 (comparison) | — | — | — | 16.2 | — | — | — | 10.8 | — | — |
| 9 | — | — | — | — | 16.2 | — | — | — | — | — |
| 11 | — | — | — | — | — | 16.2 | — | — | — | — |
| 12 (comparison) | — | — | — | — | — | 16.2 | — | 10.8 | — | — |
| 13 | 16.2 | — | — | — | — | — | — | — | — | — |
| 14 (comparison) | 16.2 | — | — | — | — | — | — | — | 10.8 | — |
| 15 | — | 16.2 | — | — | — | — | — | — | — | — |
| 16 (comparison) | — | 16.2 | — | — | — | — | — | — | 10.8 | — |
| 17 | — | — | 16.2 | — | — | — | — | — | — | — |
| 18 (comparison) | — | — | 16.2 | — | — | — | — | — | 10.8 | — |
| 19 | — | — | — | 16.2 | — | — | — | — | — | — |
| 20 (comparison) | — | — | — | 16.2 | — | — | — | — | 10.8 | — |
| 21 | — | — | — | — | 16.2 | — | — | — | — | — |
| 22 (comparison) | — | — | — | — | 16.2 | — | — | — | 10.8 | — |
| 23 | — | — | — | — | — | 16.2 | — | — | — | — |
| 24 (comparison) | — | — | — | — | — | 16.2 | — | — | 10.8 | — |
| 25 | — | — | — | — | — | — | 16.2 | — | — | — |
| 26 (comparison) | — | — | — | — | — | — | 16.2 | — | 10.8 | — |
| 27 | — | — | — | — | 24.0 | — | — | — | — | — |
| 28 (comparison) | — | — | — | — | 24.0 | — | — | — | 16.0 | — |
| 29 | — | — | — | — | — | 24.0 | — | — | — | — |
| 30 (comparison) | — | — | — | — | — | 24.0 | — | — | 16.0 | — |
| 31 | 16.2 | — | — | — | — | — | — | — | — | — |
| 32 (comparison) | 16.2 | — | — | — | — | — | — | — | — | 10.8 |
| 33 | — | 16.2 | — | — | — | — | — | — | — | — |
| 34 (comparison) | — | 16.2 | — | — | — | — | — | — | — | 10.8 |
| 35 | — | — | 2 | — | — | — | — | — | — | — |
| 36 (comparison) | — | — | 16.2 | — | — | — | — | — | — | 10.8 |
| 37 | — | — | — | 16.2 | — | — | — | — | — | — |
| 38 (comparison) | — | — | — | 16.2 | — | — | — | — | — | 10.8 |
| 39 | — | — | — | — | 16.2 | — | — | — | — | — |
| 40 (comparison) | — | — | — | — | 16.2 | — | — | — | — | 10.8 |
| 41 | — | — | — | — | — | 16.2 | — | — | — | — |

TABLE 1-continued

Compositions of molding compositions tested

| Example | | | | | | | | | | |
|---|---|---|---|---|---|---|---|---|---|---|
| 42 (comparison) | — | — | — | — | — | 16.2 | — | — | — | 10.8 |
| 43 | — | — | — | — | — | 16.2 | — | — | — | — |
| 44 | — | — | — | — | — | 16.2 | — | — | — | — |
| 45 | — | — | — | — | — | — | — | — | — | — |
| 46 | — | — | — | — | — | — | — | — | — | — |
| 47 | — | — | — | — | — | — | — | — | — | — |
| 48 | — | — | — | — | — | — | — | — | — | — |
| 49 | — | — | — | — | — | — | — | — | — | — |
| 50 | — | — | — | — | — | — | — | — | — | — |

| Example | A11 (pts by wt) | A12 (pts by wt) | B1 (pts by wt) | B2 (pts by wt) | B3 (pts by wt) | B4 (pts by wt) | B5 (pts by wt) | C1 (pts by wt) | C2 (pts by wt) |
|---|---|---|---|---|---|---|---|---|---|
| 1 | — | — | 10.8 | — | — | — | — | 73 | — |
| 2 (comparison) | — | — | — | — | — | — | — | 73 | — |
| 3 | — | — | 10.8 | — | — | — | — | 73 | — |
| 4 (comparison) | — | — | — | — | — | — | — | 73 | — |
| 5 | — | — | 10.8 | — | — | — | — | 73 | — |
| 6 (comparison) | — | — | — | — | — | — | — | 73 | — |
| 7 | — | — | 10.8 | — | — | — | — | 73 | — |
| 8 (comparison) | — | — | — | — | — | — | — | 73 | — |
| 9 | — | — | 10.8 | — | — | — | — | 73 | — |
| 11 | — | — | 10.8 | — | — | — | — | 73 | — |
| 12 (comparison) | — | — | — | — | — | — | — | 73 | — |
| 13 | — | — | — | 10.8 | — | — | — | 73 | — |
| 14 (comparison) | — | — | — | — | — | — | — | 73 | — |
| 15 | — | — | — | 10.8 | — | — | — | 73 | — |
| 16 (comparison) | — | — | — | — | — | — | — | 73 | — |
| 17 | — | — | — | 10.8 | — | — | — | 73 | — |
| 18 (comparison) | — | — | — | — | — | — | — | 73 | — |
| 19 | — | — | — | 10.8 | — | — | — | 73 | — |
| 20 (comparison) | — | — | — | — | — | — | — | 73 | — |
| 21 | — | — | — | 10.8 | — | — | — | 73 | — |
| 22 (comparison) | — | — | — | — | — | — | — | 73 | — |
| 23 | — | — | — | 10.8 | — | — | — | 73 | — |
| 24 (comparison) | — | — | — | — | — | — | — | 73 | — |
| 25 | — | — | — | 10.8 | — | — | — | 73 | — |
| 26 (comparison) | — | — | — | — | — | — | — | 73 | — |
| 27 | — | — | — | 16.0 | — | — | — | — | 60 |
| 28 (comparison) | — | — | — | — | — | — | — | — | 60 |
| 29 | — | — | — | 16 | — | — | — | — | 60 |
| 30 (comparison) | — | — | — | — | — | — | — | — | 60 |
| 31 | — | — | — | — | 10.8 | — | — | 73 | — |
| 32 (comparison) | — | — | — | — | — | — | — | 73 | — |
| 33 | — | — | — | — | 10.8 | — | — | 73 | — |
| 34 (comparison) | — | — | — | — | — | — | — | 73 | — |
| 35 | — | — | — | — | 10.8 | — | — | 73 | — |
| 36 (comparison) | — | — | — | — | — | — | — | 73 | — |
| 37 | — | — | — | — | 10.8 | — | — | 73 | — |
| 38 (comparison) | — | — | — | — | — | — | — | 73 | — |
| 39 | — | — | — | — | 10.8 | — | — | 73 | — |
| 40 (comparison) | — | — | — | — | — | — | — | 73 | — |
| 41 | — | — | — | — | 10.8 | — | — | 73 | — |
| 42 (comparison) | — | — | — | — | — | — | — | 73 | — |
| 43 | — | — | — | — | — | 10.8 | — | 73 | — |

TABLE 1-continued

Compositions of molding compositions tested

| | | | | | | | | | |
|---|---|---|---|---|---|---|---|---|---|
| 44 | — | — | — | — | — | — | — | 10.8 | 73 | — |
| 45 | 14.95 | — | — | 10.8 | — | — | — | 74.25 | — |
| 46 | 14.95 | — | — | — | — | 10.8 | — | 74.25 | — |
| 47 | 14.95 | — | — | — | — | — | 10.8 | 74.25 | — |
| 48 | — | 13.89 | — | 10.8 | — | — | — | 75.31 | — |
| 49 | — | 13.89 | — | — | — | 10.8 | — | 75.31 | — |
| 50 | — | 13.89 | — | — | — | — | 10.8 | 75.31 | — |

TABLE 2

Test values for compositions tested

| Example | $a_k^{(RT)}$ (kJ/m²) | $a_k^{(-20° C.)}$ (kJ/m²) | Vicat B (° C.) | Injection pressure (bar) | Gloss | Y1 | CR (%) |
|---|---|---|---|---|---|---|---|
| 1 | 10.4 | 7.1 | 104 | 138 | 92 | 38 | 72 |
| 2 (comparison) | 7.7 | 6.5 | 104 | 140 | 91 | 38 | 75 |
| 3 | 12.5 | 8.4 | 103 | 138 | 92 | 38 | 73 |
| 4 (comparison) | 10.1 | 7.7 | 103 | 139 | 91 | 37 | 76 |
| 5 | 14.3 | 9.8 | 103 | 138 | 92 | 39 | 75 |
| 6 (comparison) | 13.2 | 7.7 | 103 | 142 | 91 | 37 | 77 |
| 7 | 14.9 | 9.3 | 103 | 139 | 92 | 37 | 78 |
| 8 (comparison) | 11.3 | 9.1 | 103 | 142 | 91 | 37 | 80 |
| 9 | 15.6 | 10.1 | 103 | 140 | 91 | 39 | 78 |
| 10 (comparison) | 14.0 | 9.2 | 103 | 142 | 91 | 39 | 81 |
| 11 | 15.8 | 9.7 | 103 | 142 | 91 | 39 | 80 |
| 12 (comparison) | 14.4 | 8.3 | 103 | 144 | 92 | 39 | 80 |
| 13 | 12.2 | 8.2 | 103 | 137 | 91 | 36 | 73 |
| 14 (comparison) | 7.2 | 6.1 | 103 | 136 | 92 | 36 | 75 |
| 15 | 13.9 | 8.0 | 103 | 138 | 91 | 36 | 73 |
| 16 (comparison) | 9.0 | 6.6 | 104 | 136 | 92 | 36 | 75 |
| 17 | 15.5 | 8.1 | 103 | 140 | 91 | 34 | 74 |
| 18 (comparison) | 12.1 | 7.7 | 103 | 137 | 91 | 37 | 77 |
| 19 | 17.2 | 8.8 | 103 | 141 | 91 | 34 | 78 |
| 20 (comparison) | 12.0 | 7.5 | 103 | 139 | 91 | 37 | 80 |
| 21 | 17.5 | 8.0 | 103 | 141 | 92 | 34 | 77 |
| 22 (comparison) | 13.3 | 7.3 | 103 | 139 | 92 | 38 | 80 |
| 23 | 17.7 | 7.9 | 103 | 140 | 91 | 35 | 77 |
| 24 (comparison) | 15.2 | 7.5 | 103 | 139 | 91 | 38 | 80 |
| 25 | 16.8 | 7.8 | 104 | 139 | 92 | 35 | 76 |
| 26 (comparison) | 14.5 | 7.5 | 103 | 139 | 92 | 39 | 80 |
| 27 | 27.4 | 18.9 | nd | 188 | 92 | 33 | 83 |
| 28 (comparison) | 24.9 | 16.8 | nd | 186 | 92 | 34 | 86 |
| 29 | 28.1 | 18.5 | nd | 188 | 92 | 28 | 81 |
| 30 (comparison) | 24.8 | 16.8 | nd | 187 | 91 | 30 | 85 |
| 31 | 12.6 | 7.2 | 103 | 131 | 92 | 38 | 72 |
| 32 (comparison) | 8.8 | 7.0 | 104 | 137 | 92 | 38 | 75 |
| 33 | 17.2 | 7.8 | 103 | 128 | 91 | 37 | 74 |
| 34 (comparison) | 11.5 | 7.4 | 103 | 137 | 92 | 40 | 76 |
| 35 | 16.8 | 7.4 | 103 | 131 | 93 | 39 | 76 |
| 36 (comparison) | 13.6 | 7.4 | 103 | 134 | 92 | 40 | 77 |
| 37 | 19.0 | 8.0 | 102 | 132 | 92 | 38 | 80 |
| 38 (comparison) | 14.0 | 7.3 | 103 | 135 | 92 | 41 | 81 |
| 39 | 18.5 | 7.9 | 103 | 132 | 91 | 39 | 79 |
| 40 (comparison) | 15.1 | 7.4 | 104 | 137 | 92 | 39 | 80 |
| 41 | 18.5 | 7.7 | 103 | 132 | 93 | 39 | 79 |
| 42 (comparison) | 16.7 | 7.3 | 103 | 136 | 92 | 41 | 81 |
| 43 | 17.7 | 9.5 | nd | 128 | 94 | 33 | 77 |
| 44 | 17.5 | 9.8 | nd | 129 | 94 | 33 | 77 |
| 45 | 18.8 | 10.7 | nd | 135 | 93 | 36 | 78 |
| 46 | 17.5 | 10.5 | nd | 135 | 94 | 35 | 78 |
| 47 | 17.5 | 10.0 | nd | 129 | 93 | 34 | 78 |
| 48 | 17.5 | 10.6 | nd | 134 | 94 | 32 | 78 |
| 49 | 16.3 | 9.4 | nd | 134 | 94 | 33 | 78 |
| 50 | 17.1 | 9.7 | nd | 129 | 93 | 31 | 77 | nd = not determined

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) at least one grafted rubber that is a product of free-radical emulsion polymerisation wherein at least one vinyl monomer is polymerized in the presence of at least one rubber a) that is present in the form of a latex, said rubber having a glass transition temperature lower than 0° C., the polymerization being initiated by at least one compound selected from the group consisting of ammonium peroxodisulfate, potassium peroxodisulfate and sodium peroxodisulfate,
   B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C., the polymerization being initiated by at least one redox system, and optionally
   C) at least one thermoplastic, rubber-free polymer that is the product of the polymerisation of at least one resin-forming vinyl monomer,
   wherein the grafted rubbers A) and B) are prepared separately.

2. The composition of claim 1 wherein said at least vinyl monomer of said A) comprise styrene and acrylonitrile in a weight ratio of 90:10 to 50:50 therebetween, wherein optionally at least one of said styrene and acrylonitrile is at least partly replaced by at least one member selected from the group consisting of α-methylstyrene, methyl methacrylate and N-phenylmaleimide.

3. The composition of claim 2 wherein at least one of said styrene and acrylonitrile is at least partly replaced by at least one member selected from the group consisting of αmethylstyrene, methyl methacrylate and N-phenylmaleimide.

4. The composition of claim 1 wherein said at least vinyl monomer of said B) comprise styrene and acrylonitrile in a weight ratio of 90:10 to 50:50 therebetween, wherein optionally at least one of said styrene and acrylonitrile is at least partly replaced by at least one member selected from the group consisting of α-methylstyrene, methyl methacrylate and N-phenylmaleimide.

5. The composition of claim 4 wherein at least one of said styrene and acrylonitrile is at least partly replaced by at least one member selected from the group consisting of α-methylstyrene, methyl methacrylate and N-phenylmaleimide.

6. The composition of claim 1 wherein said redox system contains at least one oxidizing agent selected from the group consisting of di-tert.-butyl peroxide, cumene hydroperoxide, dicyclohexyl percarbonate, tert.-butyl hydroperoxide, p-menthane peroxide, $_2O_2$, and at least one reducing agent selected from the group consisting of salts of sulfinic acid, salts of sulfurous acid, sodium dithionite, sodium sulfite, sodium hyposulfite, sodium hydrogen sulfite, ascorbic acid and its salts, sodium formaldehyde sulfoxylate, mono- and dihydroxyacetone, sugars, glucose, dextrose, iron(II) salts, tin(II) salts and titanium(II) salts.

7. The composition of claim 1 wherein A) is present in an amount of 20 to 90% and B) is present in an amount of 10 to 80%, said percents, both occurrences, being relative to the total weight of A, B and C.

8. The composition of claim 1 wherein A) Is present in an amount of 30 to 80% and B) is present in an amount of 20 to 70%, said percents, both occurrences, being relative to the total weight of A, B and C.

9. The composition of claim 1 wherein C is present in an amount of 50 to 2000 parts by weight per 100 parts by weight of the total weight of A+B.

10. The composition of claim 1 wherein C is present in an amount of 100 to 1500 parts by weight per 100 parts by weight of the total weight of A+B.

11. The composition of claim 1 wherein each of the rubber latices of said A and of said B conform to monomodal distributions of particle sizes.

12. The composition of claim 1 wherein each of the rubber latices of said A and of said B conform to bimodal distributions of particle sizes.

13. The composition of claim 1 wherein rubber latices of said A and of said B have average particles diameters ($d_{50}$) of 50 to 600 nm.

14. The composition of claim 13 wherein ($d_{50}$) is 100 to 500 nm.

15. The composition of claim 1 wherein average particle diameter ($d_{50}$) of the rubber latex of A is smaller than the average particle diameter ($d_{50}$) of the rubber latex of B.

16. A method of using the composition of claim 1 comprising producing a molded article.

17. The moldings produced by the method of claim 1.

18. The composition of claim 1 wherein at least one resin-forming vinyl monomer of said C) is styrene and acrylonitrile in a weight ratio of 90:10 to 50:50 therebetween, wherein optionally at least one of said styrene and acrylonitrile is at least partly replaced by at least one member selected from the group consisting of α-methylstyrene, methyl methacrylate and N-phenylmaleimide.

19. A process for the production of thermoplastic molding compositions comprising mixing at an elevated temperature
   A) at least one grafted rubber that is a product of free-radical emulsion polymerisation wherein at least one vinyl monomer is polymerised in the presence of at least one rubber a) that is present in the form of a latex, said rubber having a glass transition temperature lower than 0° C., the polymerization being initiated by at least one compound selected from the group consisting of ammonium peroxodisulfate, potassium peroxodisulfate and sodium peroxodisulfate,
   B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C., the polymerization being initiated by at least one redox system, and optionally
   C) at least one thermoplastic, rubber-free polymer that is the product of the polymerisation of at least one resin-forming vinyl monomer,
   wherein the grafted rubbers A) and B) are prepared separately.

20. A thermoplastic molding composition comprising
   A) at least one grafted rubber that is a product of free-radical emulsion polymerisation wherein at least one vinyl monomer is polymerised in the presence of at least one rubber a) that is present in the form of a latex, said rubber having a glass transition temperature lower than 0° C., and conforming to a monomodal particle size distribution, the polymerization being initiated by at least one compound selected from the group consisting of ammonium peroxodisulfate, potassium peroxodisulfate and sodium peroxodisulfate, B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C. and conforming to a trimodal particle size distribution, the polymerization being initiated by at least one redox system, and optionally C) at least one thermoplastic, rubber-free polymer that is the product of the polymerisation of at least one resin-forming vinyl monomer, wherein the grafted rubbers A) and B) are prepared separately.

21. A thermoplastic molding composition comprising

A) at least one grafted rubber that is a product of free-radical emulsion polymerisation wherein at least one vinyl monomer is polymerised in the presence of at least one rubber a) that is present in the form of a latex, said rubber having a glass transition temperature lower than 0° C. and conforming to a bimodal particle size distribution, the polymerization being initiated by at least one compound selected from the group consisting of ammonium peroxodisulfate, potassium peroxodisulfate and sodium peroxodisulfate, B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C. and conforming to a bimodal particle size distribution, the polymerization being initiated by at least one redox system, and optionally C) at least one thermoplastic, rubber-free polymer That is the product of the polymerisation of at least one resin-forming vinyl monomer, wherein the grafted rubbers A) and B) are prepared separately.

22. A thermoplastic molding composition comprising

A) at least one grafted rubber that is a product of free-radical emulsion polymerisation wherein at least one vinyl monomer is polymerised in the presence of at least one rubber a) that is present in the form of butadiene latex, said rubber having a glass transition temperature lower than 0° C., the polymerization being initiated by at least one compound selected from the group consisting of ammonium peroxodisulfate, potassium peroxodisulfate and sodium peroxodisulfate, B) at least one grafted rubber that is a product of free-radical emulsion polymerisation wherein at least one vinyl monomer is polymerized in The presence of at least one rubber b) that is present in the form of butadiene latex, said rubber having a glass transition temperature lower than 0° C., the polymerization being initiated by at least one redox system, and optionally C) at least one thermoplastic, rubber-free polymer that is the product of the polymerisation of at least one resin-forming vinyl monomer, wherein the grafted rubbers A) and B) are prepared separately.

23. The composition of claim 22 wherein said at least vinyl monomer of said A) comprise styrene and acrylonitrile in a weight ratio of 90:10 to 50:50 therebetween wherein optionally at least one of said styrene and acrylonitrile is at least partly replaced by at least one member selected from the group consisting of α-methylstyrene, methyl methacrylate and N-phenylmaleimide.

24. The composition of claim 22 wherein said at least vinyl monomer of said B) comprise styrene and acrylonitrile in a weight ratio of 90:10 to 50:50 therebetween wherein optionally at least one of said styrene and acrylonitrile is at least partly replaced by at least one member selected from the group consisting of α-methylstyrene, methyl methacrylate and N-phenylmaleimide.

25. The composition of claim 22 wherein A) is present in an amount of 20 to 90 % and B) is present in an amount of 10 to 80%, said percents, both occurrences, being relative to the total weight of A, B and C.

26. The composition of claim 22 wherein C is present in an amount of 50 to 2000 parts by weight per 100 parts by weight of the total weight of A+B.

27. The composition of claim 22 wherein the rubber latices of said A and of said B conform to monomodal distributions of particle sizes.

28. The composition of claim 22 wherein the rubber latices of said A and of said B conform to bimodal distributions of particle sizes.

29. The composition of claim 22 wherein the rubber latex of said A conforms to a monomodal particle size distribution and the rubber latex of said B conforms to a bimodal particle size distribution.

30. The composition of claim 22 wherein the rubber latex of said A conforms to a monomodal particle Size distribution and the rubber latex of said B conforms to a bimodal particle size distribution.

31. The composition of claim 22 wherein the rubber latex of said A conforms to a bimodal particle size distribution and the rubber latex of said B conforms to a trimodal particle size distribution.

32. The composition of claim 22 wherein the rubber latex of said A conforms to a bimodal particle size distribution and the rubber latex of said B conforms to a monomodal particle size distribution.

33. The composition of claim 22 wherein rubber latices of said A and of said B have average particles diameters ($d_{50}$) of 50 to 600 nm.

34. The composition of claim 33 wherein ($d_{50}$) is 100 to 500 nm.

35. The composition of claim 22 wherein average particle diameter ($d_{50}$) of the rubber latex of A is smaller than the average particle diameter ($d_{50}$) of the rubber latex of B.

36. A Thermoplastic molding composition comprising

A) at least one grafted rubber that is a product of free-radical emulsion polymerisation wherein at least one vinyl monomer is polymerised in the presence of at least one rubber a) that is present in the form of a latex, said rubber having a glass transition temperature lower than 0° C., the polymerization being initiated by at least one compound selected from the group consisting of ammonium peroxodisulfate, potassium peroxodisulfate and sodium peroxodisulfate, B) at least one grafted rubber that is a product of free-radical emulsion polymerisation wherein at least one vinyl monomer is polymerized in the presence of at least one rubber b) that is present in the form of a latex, said rubber having a glass transition temperature lower than 0° C., the polymerization being initiated by at least one redox System, C) as an optional component at least one thermoplastic, rubber-free polymer that is the product of the polymerisation of at least one resin-forming vinyl monomer, and further comprising at least one resin selected from the group consisting of aromatic polycarbonate, aromatic polyestercarbonate, polyester and polyamide, wherein the grafted rubbers A) and B) are prepared separately.

37. A thermoplastic molding composition comprising
A) at least one grafted rubber that is a product of free-radical emulsion polymerisation wherein at least one vinyl monomer is polymerised in the presence of at least one rubber a) that is present in the form of a latex conforming to a monomodal particle size distribution, said rubber having a glass transition temperature lower than 0° C., the polymerization being initiated by at least one compound selected from the group consisting of ammonium peroxodisulfate, potassium peroxodisulfate and sodium peroxodisulfate,
B) at least one grafted rubber that is a product of free-radical emulsion polymerisation wherein at least one vinyl monomer is polymerized in the presence of at least one rubber b) that is present in the form of a latex conforming to a bimodal particle size distribution, said rubber having a glass transition temperature lower than 0° C., the polymerization being initiated by at least one redox system, and optionally
C) at least one thermoplastic, rubber-free polymer that is the product of the polymerisation of at least one resin-forming vinyl monomer,
wherein the grafted rubbers A) and B) are prepared separately.

38. A thermoplastic molding composition comprising
A) at least one grafted rubber that is a product of free-radical emulsion polymerisation wherein at least one vinyl monomer is polymerised in the presence of at least one rubber a) that is present in the form of a latex conforming to a bimodal particle size distribution, said rubber having a glass transition temperature lower than 0° C., the polymerization being initiated by at least one compound selected from the group consisting of ammonium peroxodisulfate, potassium peroxodisulfate and sodium peroxodisulfate,
B) at least one grafted rubber that is a product of free-radical emulsion polymerisation wherein at least one vinyl monomer is polymerized in the presence of at least one rubber b) that is present in the form of a latex conforming to a monomodal particle size distribution, said rubber having a glass transition temperature lower than 0° C., the polymerization being initiated by at least one redox system, and optionally
C) at least one thermoplastic, rubber-free polymer that is the product of the polymerisation of at least one resin-forming vinyl monomer,
wherein the grafted rubbers A) and B) are prepared separately.

* * * * *